United States Patent
Heckel et al.

(10) Patent No.: US 9,916,472 B2
(45) Date of Patent: Mar. 13, 2018

(54) OBFUSCATION AND PROTECTION OF DATA RIGHTS

(71) Applicant: International Business Machines Corporation, Armonk, NY (US)

(72) Inventors: Reinhard W. Heckel, Zurich (CH); Michail Vlachos, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 66 days.

(21) Appl. No.: 14/805,514

(22) Filed: Jul. 22, 2015

(65) Prior Publication Data

US 2017/0024575 A1    Jan. 26, 2017

(51) Int. Cl.
   *G06F 21/62* (2013.01)
   *G06F 21/16* (2013.01)

(52) U.S. Cl.
   CPC .......... *G06F 21/6245* (2013.01); *G06F 21/16* (2013.01); *G06F 2221/0748* (2013.01)

(58) Field of Classification Search
   CPC .. G06F 21/6209; G06F 21/6245; G06F 21/16; G06F 2221/0748
   USPC .......................................................... 726/26
   See application file for complete search history.

(56) References Cited

U.S. PATENT DOCUMENTS

| 8,769,293 | B2 | 7/2014 | Vlachos et al. |
| 9,509,495 | B2 | 11/2016 | Lee et al. |
| 2006/0167784 | A1* | 7/2006 | Hoffberg .............. G06Q 20/401 705/37 |
| 2009/0094265 | A1* | 4/2009 | Vlachos .................. G06F 21/16 |
| 2009/0158051 | A1 | 6/2009 | Michiels et al. |
| 2009/0254971 | A1* | 10/2009 | Herz ....................... G06Q 10/10 726/1 |

(Continued)

OTHER PUBLICATIONS

Kenthapadi et al., "Privacy via the Johnson-Lindenstrauss Transform", Apr. 13, 2012, pp. 1-24.

(Continued)

*Primary Examiner* — Kambiz Zand
*Assistant Examiner* — Benjamin Kaplan
(74) *Attorney, Agent, or Firm* — L. Jeffrey Kelly

(57) ABSTRACT

Embodiments of the present invention disclose a method, computer program product, and system for data obfuscation and right-protection. An initial matrix $X_i$, represents the initial data set of the application and final matrix $X_f$ is obtained from $X_i$. The final matrix $X_f$ is obtained by performing one of the following operations $X_f=(P(X_i)+E)F$; $X_f=P(X_i)F+E$; and $X_f=P(X_iF)+E$. Where P(.) is a projection operator that projects an input initial matrix in a space having a lower dimension than the input matrix, E represents a noise matrix, and F represents a matrix as a perturbation series. The matrix F is represented as a perturbation series, whose leading term is the identity matrix I, one or more higher-order terms of the perturbation series embedding a secret, multiplicative noise, so as for a matrix multiplied by the matrix F is right-protected.

13 Claims, 4 Drawing Sheets

(56) References Cited

U.S. PATENT DOCUMENTS

2015/0169897 A1  6/2015 Leggette et al.

OTHER PUBLICATIONS

Dwork et al., "Our Data, Ourselves: Privacy via Distributed Noise Generation", Eurocrypt'06, Proceedings of the 24th Annual International Conference on The Theory and Applications of Cryptographic Techniques, 2006, pp. 486-503.
Vlachos et al., "On Data Publishing with Clustering Preservation", ACM Transactions on Knowledge Discovery from Data, vol. 9. No. 3, Article 23, Publication date: Apr. 2015, pp. 23-30.

* cited by examiner

OBFUSCATION AND PROTECTION OF DATA RIGHTS

BACKGROUND

The present invention relates generally to the field of data security, and more particularly to computer implemented data obfuscation and right-protection using matrix operations.

In fields such as health care, finance and retail, organizations may collect valuable and sensitive data about individuals. It may be desirable to enable third parties to perform data mining tasks on collected data without revealing private information of the individuals. Before relinquishing data to other organizations, the data have to be obfuscated, in order to protect the private information of the individuals, and right-protected, so that the rightful owner can be determined. In the field of right-protection, various methodologies are used to embed ownership within data using a key, for example Fourier descriptors. There are various known processes to add digital noise to data such that the data is private but useful for certain data mining tasks, for example, data utility preserved to a predetermined degree.

SUMMARY

Embodiments of the present invention disclose a method, computer program product, and system for data obfuscation and right-protection. An initial matrix $X_i$, is accessed by a computer. The initial matrix $X_i$ represents the initial data set of the application. From the initial matrix $X_i$, a final matrix $X_f$ is obtained. The final matrix $X_f$ is obtained by performing one of the following operations $X_f = (P(X_i) + E)F$; $X_f = P(X_i)F + E$; and $X_f = P(X_iF) + E$. In the forgoing operations $P(.)$ is a projection operator that projects an input initial matrix in a space having a lower dimension than the input matrix, E represents a noise matrix, and F represents a matrix as a perturbation series. The matrix F is represented as a perturbation series, whose leading term is the identity matrix I, one or more higher-order terms of the perturbation series embedding a secret, multiplicative noise, so as for a matrix multiplied by the matrix F is right-protected.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings, in which.

DETAILED DESCRIPTION

Figure 1A:
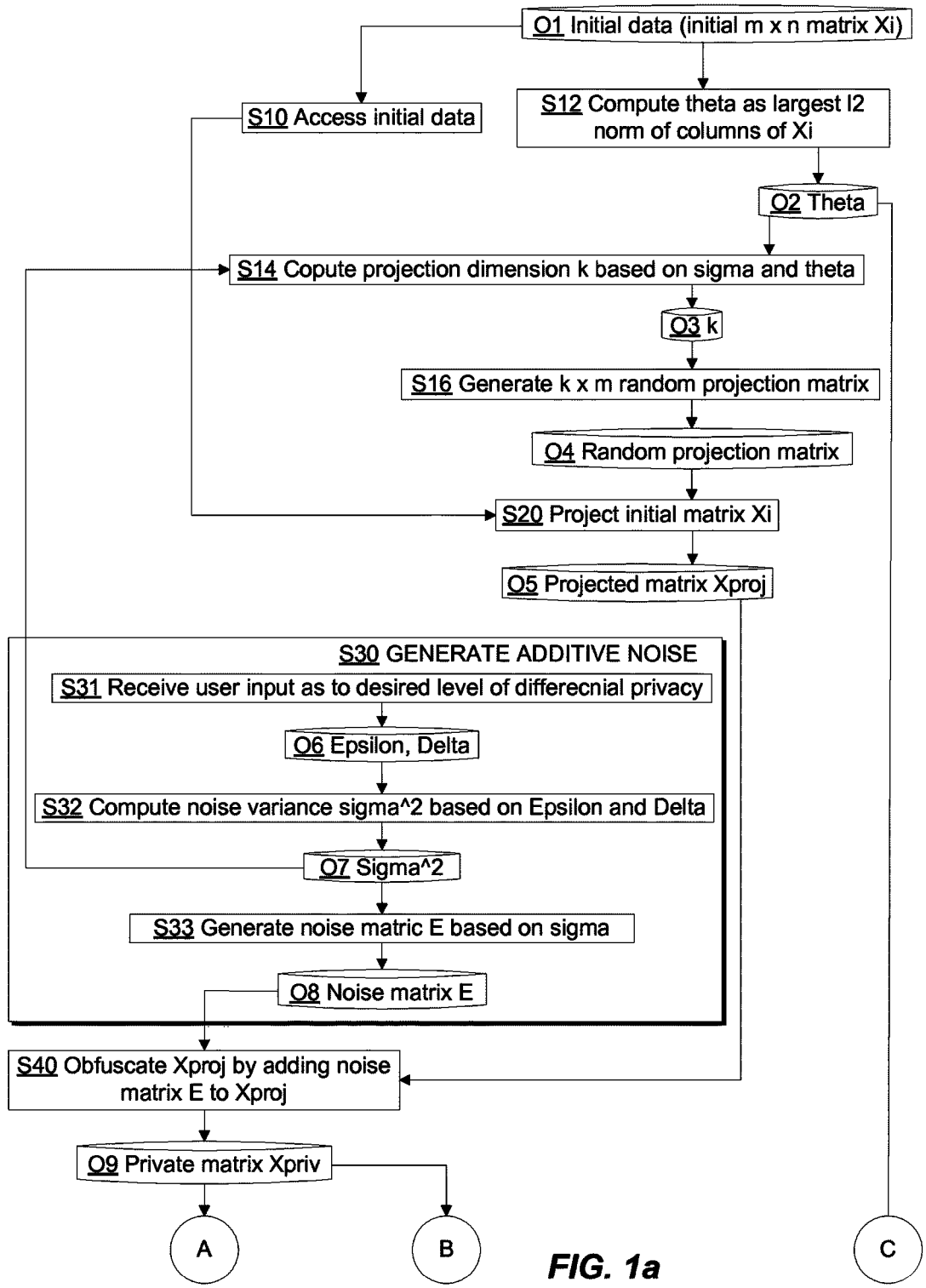
FIGS. 1a-1b are schematic block and flow diagrams illustrating a method or process of data obfuscation and right-protection, including objects within the method, in accordance with an embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention disclose a method, computer program product, and system for data obfuscation and right-protection. An initial matrix $X_i$, is accessed by a computer. The initial matrix $X_i$ represents the initial data set of the application. From the initial matrix $X_i$, a final matrix $X_f$ is obtained. The final matrix $X_f$ is obtained by performing one of the following operations $X_f=(P(X_i)+E)F$; $X_f=P(X_i)F+E$; and $X_f=P(X_iF)+E$. In the forgoing operations $P(.)$ is a projection operator that projects an input initial matrix in a space having a lower dimension than the input matrix, E represents a noise matrix, and F represents a matrix as a perturbation series. The matrix F is represented as a perturbation series, whose leading term is the identity matrix I, one or more higher-order terms of the perturbation series embedding a secret, multiplicative noise, so as for a matrix multiplied by the matrix F is right-protected.

In an exemplary embodiments, the final matrix $X_f$ is obtained by projecting the initial matrix $X_i$ in a space having a lower dimension than the initial matrix. To obtain a projected matrix $X_{Proj}$ the following operations is used: $X_{Proj}=P(X_i)$. Obfuscating the projected matrix $X_{Proj}$ obtains a private matrix $X_{Priv}$ that can be obtained using the following operation: $X_{Priv}=X_{Proj}+E=P(X_i)+E$. The private matrix is obfuscated by adding the noise matrix E to the projected matrix $X_{Proj}$, so as to embed noise therein and multiplying the private matrix $X_{Priv}$ by the matrix F. Matrix F is representable as a perturbation series, whose leading term is the identity matrix I, and one or more higher-order terms of the perturbation series embed a secret, multiplicative noise, such that the final matrix $X_f$, represented by the equation $X_f=(P(X_i)+E)F$, is right-protected.

According to another aspect, the invention is embodied as a computerized system for both data obfuscation and right-protection. The system comprises a processing unit and a memory comprising computerized methods, the latter configured, upon execution by the processing unit, for performing all the steps of the above computer-implemented method for data obfuscation and right-protection.

According to a final aspect, the invention is embodied as a computer program product for assisting database management, the computer program product comprising a computer readable storage medium having program instructions embodied therewith, the program instructions being executable by a computerized system to cause to execute all of steps of the above method for data obfuscation and right-protection.

Figure 1B:
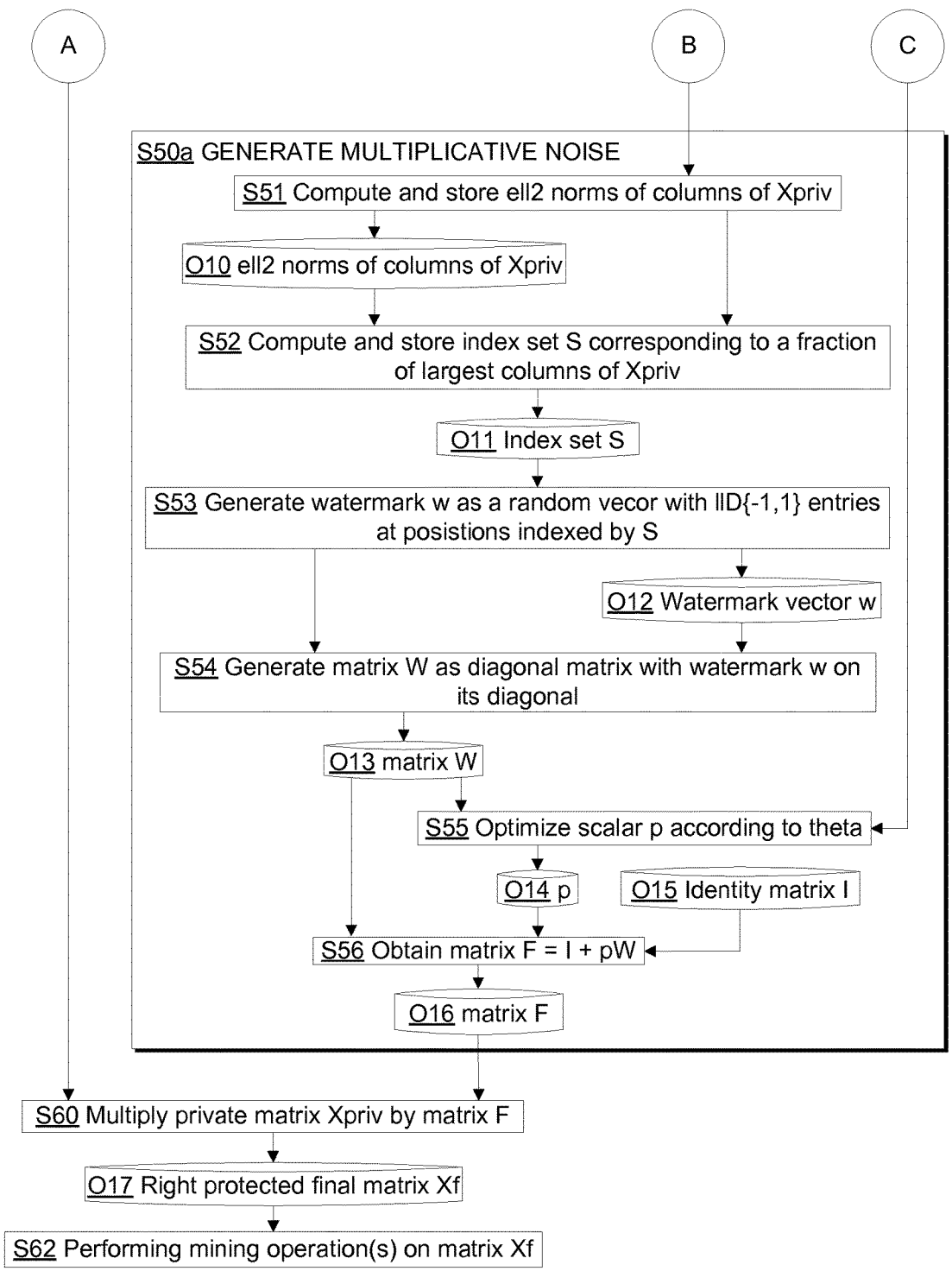

The present invention will now be described in detail with reference to the Figures. FIGS. 1a-1b are flowcharts, with embedded corresponding objects, illustrating a method of data obfuscation and right-protection, in accordance with one embodiment of the present invention. The present invention includes methods that may revolve around two main steps and resulting processes. The method depicted in FIG. 1a, includes an initial step, S10, in which an initial matrix Xi 1 is accessed via one or more processing elements, initial matrix Xi 1 representing the initial data of the method. The initial data may be provided in matrix form, however this is only exemplary and is not intended to be a limitation. If not represented in matrix form, it may be then necessary to first convert data into a matrix form. In a second step, the described methods in reference to steps S20-S40 in FIG. 1a and steps S50a, S51, S52, S53, S54, S55, S56, and S60 in FIG. 1b obtain a final matrix $X_f$ 17, in FIG. 1b, from the initial matrix Xi 1 in FIG. 1a, via one or more processing elements, to be described below, by performing one of the following operations:

$X_f=(P(X_i)+E)F;$ $X_f=P(X_i)F+E;$ and $X_f=P(X_iF)+E.$

In the above operations: P(.) is a projection operator that projects an input initial matrix $X_i$ in a space having a lower dimension than the input matrix; the matrix E is a noise matrix; and the matrix F is representable as a perturbation series, whose leading term is the identity matrix I. One or more higher-order terms of the perturbation series embed a secret, multiplicative noise, which may cause a matrix multiplied by the matrix F to be right-protected. It may be appreciated that the matrix multiplications described herein consist of dot products.

Each of the three operations described above may make it possible to embed both additive and multiplicative noise to the data, to both obfuscate and right-protect a given dataset. Common current techniques, which would involve a projection step after obfuscating, may be less efficient. These processes may add noise before projecting data and would require additional noise, quantitatively, in order to achieve a same level of privacy that may be achieved when adding noise after projection.

The methods presented, according to the invention, combine obfuscation and right-protection to construct modified data instances that are both privatized and right-protected. Obfuscation and right-protection may be combined so as to preserve some properties of the data, which may be useful for certain important data mining tasks, such as clustering and nearest neighbor computations. Although several solutions exist that allow obfuscate data or right-protect data, separately, the present methods describe a method that may allow the publication of private and right-protected datasets. In various embodiments the present invention may be implemented via matrix multiplications and, therefore, may be executed using various means, for example, by central and graphics processing units (CPUs and GPUs).

In the area of right-protection, solutions have been proposed which use various methodologies to embed an ownership key, for example, keys based on Fourier descriptors, whereas in in various embodiments of the present invention, right-protection may be achieved by multiplying a data matrix with a certain matrix, which may depend on a watermark or key, as described in detail below.

In exemplary embodiment, the sequence of operations to obtain the final matrix $X_f$ is the first operation $X_f=(P(X_i)+E)F$. Referring to FIG. 1a, the initial matrix $X_i$ 1 is first projected, in step S20, in a space having a lower dimension than the initial matrix, to obtain a projected matrix $X_{Proj}=P(X_i)$. The projected matrix $X_{Proj}$ 5 is obfuscated, in step S40, to obtain a private matrix $X_{Priv}$ 9, where $X_{Priv}=X_{Proj}+E=P(X_i)+E$. As described above, obfuscating comprises adding the noise matrix E 8 to the projected matrix $X_{Proj}$ 5, so as to embed noise therein. The noise added is typically Gaussian Noise, as discussed below in detail, although it should be appreciated that noise may be drawn from other similar distributions, for example, bell shaped distribution. In reference to FIG. 1b, the private matrix $X_{Priv}$ 9 is multiplied, in step S60, by the matrix F 16. The matrix F 16 may be represented as a perturbation series, whose leading term is the identity matrix I 15 of FIG. 1b. One or more higher-order terms of the perturbation series may embed the secret, multiplicative noise, such that the final matrix may be represented by $X_f$ 17, where $X_f=(P(X_i)+E)F$ and is right-protected.

In an embodiment, the final matrix F may be obtained by perturbing the private matrix. The matrix F may not be provided explicitly as a perturbation series. Matrix F may be a single matrix, which matrix may nevertheless be represented, i.e., expanded, as a perturbation series. In various embodiments, the described methods may explicitly use a short perturbation series, e.g., truncated after the first-order term. The first-order term of the expansion may be written as pW, where the matrix W embeds a secret, multiplicative noise, and the scalar value p controls the magnitude of the perturbation. Having a small scalar p may allow the preservation of some properties of the private matrix.

In various embodiments, the initial matrix $X_i$ may be multiplied and then projected, despite the exemplary embodiment described where the operation follows the function $X_f=(P(X_i)+E)F)$. The exemplary operation may be favorable as both the additive and multiplicative noises may be embedded in a reduced dimension space and the right-protection intervenes in a final step, which may make detection easier. Additionally the matrix to which matrix F is applied may be made differentially private, which may allow a more favorable detection scheme as described in FIG. 2.

Embodiments of the present methods may be advantageous in several respects. The described methods may provide a response to the problem of Big Data obfuscation and right-protection while retaining utility of the data. The methodology described according to the present invention may be scalable and only require random projections and matrix addition and multiplications, which may be amenable to GPU implementation. In various embodiments, analytical and privacy guarantees may be provided and right-protection may be detectable even under severe data modification.

Referring again to FIGS. 1a-b, in various embodiments, multiplicative noise may be designed to have a lower magnitude than the added noise, as in step S50a. The matrix F 16 may be explicitly provided as a perturbation series of the identity matrix I 15, which series may be truncated after the first-order correction term. For example, the matrix F 16 can be represented as $I+I_1$, where the matrix $I_1$ embeds the secret, multiplicative noise. For example, the matrix $I_1$ may comprise, or be restricted to pW, where matrix W 13 is a diagonal matrix containing a watermark w 12 on its diagonal, with w 12 chosen, in step S53, as a secret, random vector, and p 14 is a scalar chosen in step S55 such as for the secret, multiplicative noise pW to have a lower magnitude than the additive noise E 8. In step S53, the watermark w 12 may be chosen as a random vector with independent and identically distributed $\{-1, 1\}$ entries at positions indexed by S 11, where S 11 is an index set corresponding to a fraction of the largest columns (in $\ell^2$ norm 10) of the private matrix $X_{Priv}$ 9. The fraction at stake may consist of the n/2 largest columns, where n is the number of columns of the initial m×n matrix.

In an embodiment, the noise matrix E 8 used in step S40 to obtain the private matrix $X_{Priv}$ 9 is a matrix with independent and identically distributed zero mean Gaussian random variables, whose noise variance is $\sigma^2$ 7 where $\sigma$ is "sigma" in FIG. 1a. The variance $\sigma^2$ 7 may be taken as inversely proportional to $\epsilon^2$; where $\epsilon$ is a parameter impacting the level of differential privacy desired for the final matrix $X_f$ 17. The parameterization for the final matrix $X_f$ 17 may be $(\epsilon, \delta)$O6 or a differential private, as in steps S30, S31, S32, and S33 where $\epsilon$ is "epsilon" and $\delta$ is "delta" in FIG. 1a. The above scheme may conform to a differential privacy guaranty, for example, a guarantees regarding data privacy.

In an embodiment, $\sigma^2$ 7 may be taken as approximately inversely proportional to $\epsilon^2$, in order to satisfy the following inequality:

$$\sigma^2 \geq \frac{1}{\epsilon^2}\left(1 + \sqrt{\left(\log\left(\frac{4}{\delta}\right)/kc\right)}\right)\left(\log\left(\frac{2}{\delta}\right) + 4\epsilon\right),$$

rather than the strict equality, where $\epsilon$, $\delta$ 6 are the differential privacy parameters and c is a constant determined by the projection P.

In an embodiment, a random projection may be defined P(x)=Ax, where A is a random projection matrix satisfying the concentration inequality, for all x and all t>0, Probability $[|\|Ax\|^2 - \|x\|^2| \geq t\|x\|^2] \leq 2 \exp(-c\, k\, t^2)$. The parameter k is a projection dimension k of the projection operator. As a result, the final matrix $X_f$ is $\epsilon$, $\delta$-differentially private, as the resulting differential privacy may use two parameters $\epsilon$, $\delta$, as opposed to differential privacy methods that may use parameter $\epsilon$ only. Note that the utility of the data may be preserved as the distances between the columns are approximately retained. Since random noise may be added, the distance can only be preserved up to a given probability, which may be optimized to be high in the present context. The pairwise distances may be preserved in that the $l^2$ norm of $x_i - x_j$ may be approximately equal to the $l^2$ norm of $y_i - y_j$, for all pairs i, j, where $x_i$'s are columns of $X_i$ and $y_i$'s are columns of $X_{Priv}$. This can be represented by the equation:

$$\|x_i - x_j\|(1-\epsilon) \leq \|y_i - y_j\| \leq \|x_i - x_j\|(1+\epsilon) \text{ for all pairs } i, j \text{ and for some constant } \epsilon \text{ in } (0, 1).$$

Returning to FIGS. 1a-b, in various embodiments, an operator P(.), as described in reference to the operations of FIGS. 1a-1b, may be random k×m projection matrix 4, whose projection dimension k 3 may be inversely proportional to the noise variance $\sigma^2$ 7 and proportional to $\theta^2$, where $\theta$ 2 is "theta" in FIG. 1a and may represent the largest $l^2$ norm of the columns of the initial matrix $X_i$ 1, as in steps S12, S14, and S16. The distances between the data may be affected by (1) the data projection and (2) the noise added in the data. Accordingly, the described methods may be designed to determine k 3, in order to allow sum of the projection error and the noise error to be minimized, where the exact minimum may depend on the data instance.

In various embodiments, the scalar p 14, may be chosen to be inversely proportional to $\theta$ 2, such that the secret, multiplicative noise, pW may have a lower magnitude than the added Gaussian noise, embedded through the noise matrix E 8, as in steps S50 and steps S51-S56 in FIG. 1b. In various embodiments then the parameters are chosen as described above, the resulting final data $X_f$ 17 is differentially private; the impact of watermarking on utility is essentially negligible; and the watermark w is detectable and may be detectable after various types of attacks that a malicious attacker may try to destroy the watermark by disturbing the data.

As described above, the magnitude of the secret, multiplicative noise may be chosen so as to essentially preserve the pairwise distances between data of the initial dataset $X_i$ 1. This may allow the performed mining operations in step S62 on the final matrix $X_f$ 17. Such mining operations may rely on the distances or angles between data points. For example, such mining operations may comprise one or more of the following: a search; a classification; and a clustering operation on the final matrix $X_f$ 17.

Figure 2:
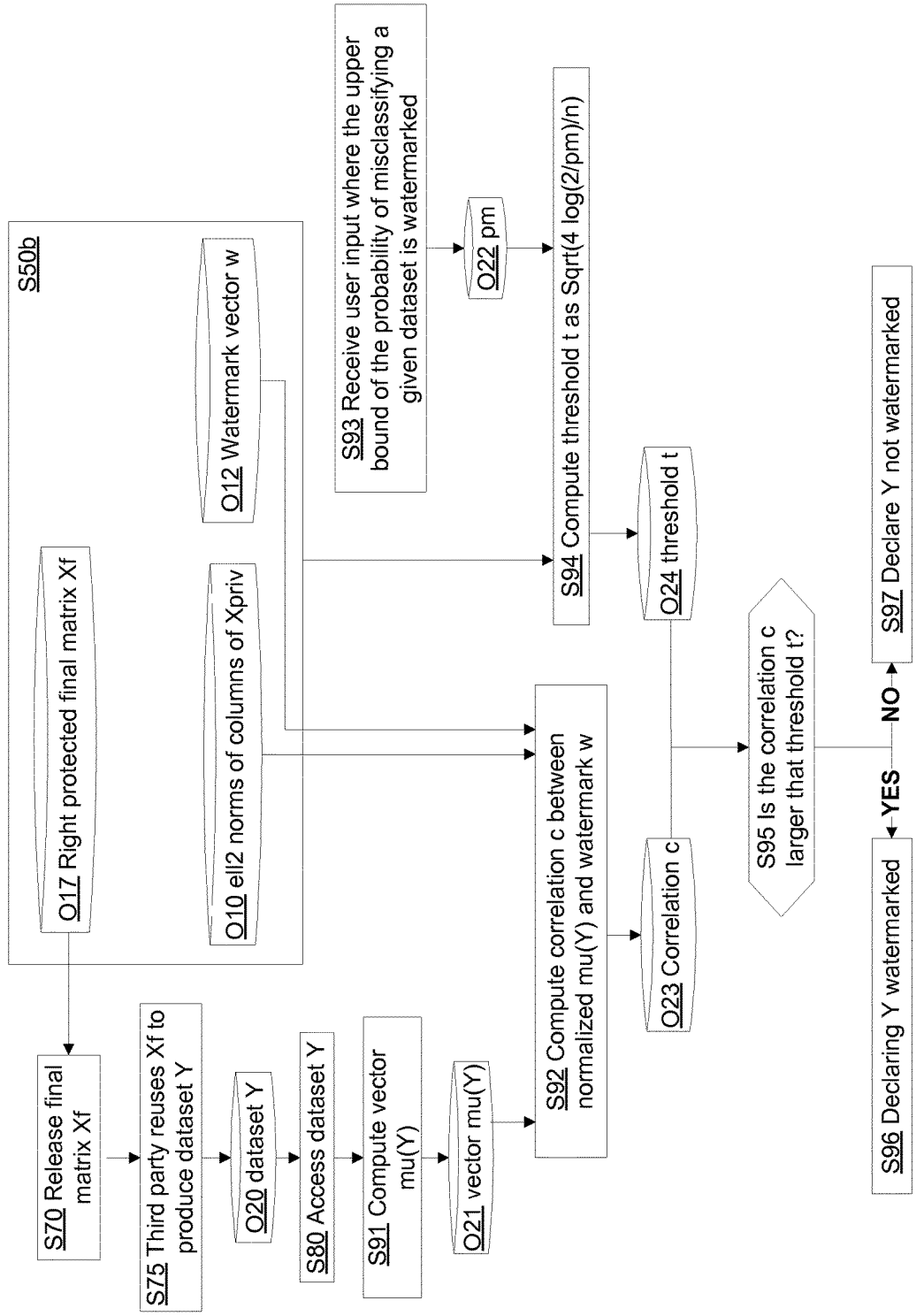
FIG. 2 is schematic block diagram flow diagram illustrating a method or process for detecting right-protected data obtained according to the flowchart of FIGS. 1a-1b.

Referring now to FIGS. 1 and 2, FIG. 2 is a flowchart illustrating high-level steps of an embodiment of a method for detecting right-protected data obtained according to the flowcharts of FIGS. 1a-1b. In various embodiments, Step S50b includes various steps from FIG. 1a where ell$^2$ norms $\|X_i\|_2$ of columns of the private matrix $X_{Priv}$ 10, where $X_{Priv}=[x_1, \ldots, x_n]$, are stored in step S51 prior to making the final data $X_f$ 17 in step S70, available to third-parties. This may enable detection scheme of the watermarked dataset. A possible detection scheme of the watermarked dataset is now described in reference to FIG. 2. The final data $X_f$ 17 is released, as in step S70, a third party re-uses final data $X_f$ 17, in step S75, illegitimately or illegally, and the third party may have access to a dataset Y 20, where Y $20=[y_1, \ldots, y_n]$, in step S80. Dataset Y 20 may be released by a third party, and may infringe the initially released data $X_f$ 17. Verification takes place in steps S91-S97 as to whether the dataset Y 20 is watermarked with the watermark w 12. Vector $\mu(Y)$ 21 is computed, in step S91, as vector having entries $\mu(Y)$ 21, where $\mu(Y)$ O21={$(\|y_i\|_2^2 - \|x_i\|_2^2)/\|x_i\|_2^2$, if i in S; 0 if i not in S}. In step S92 the correlation c 23 between normalized versions of $\mu(Y)$ 21 and w 12 is computed, each normalized according to the ell$^2$ norm 10. The dataset Y 20 is declared, in decision step S95 "YES" branch, and is watermarked if the computed correlation c 23 is larger than a threshold t 24 (t 24 in the set [0,1]), in step S96. If the data Y 20 correlation is not larger than a threshold, in decision step S95 "NO" branch, the data set Y 20 is not watermarked, in step S97.

The threshold t 24 used for declaring the dataset Y 20 watermarked or not may be chosen as $\sqrt{4\log(2/p_m)/n}$, where $p_m$ 22 is an upper bound on the probability of misclassifying a given dataset as watermarked and n is the number of columns of the initial matrix $X_i$ 1, as received in step S93 and computed in step S94. The user is prompted in step S93 to choose the bound $p_m$ 22, which bound is then used as an input parameter. The value for $p_m$ 22 may be low. The parameter $p_m$ 22 may not have much influence on the threshold t 24, because of the logarithm. Note that the above method only depends on the watermark and extra information available to the user, and may succeed under general conditions.

Figure 3:
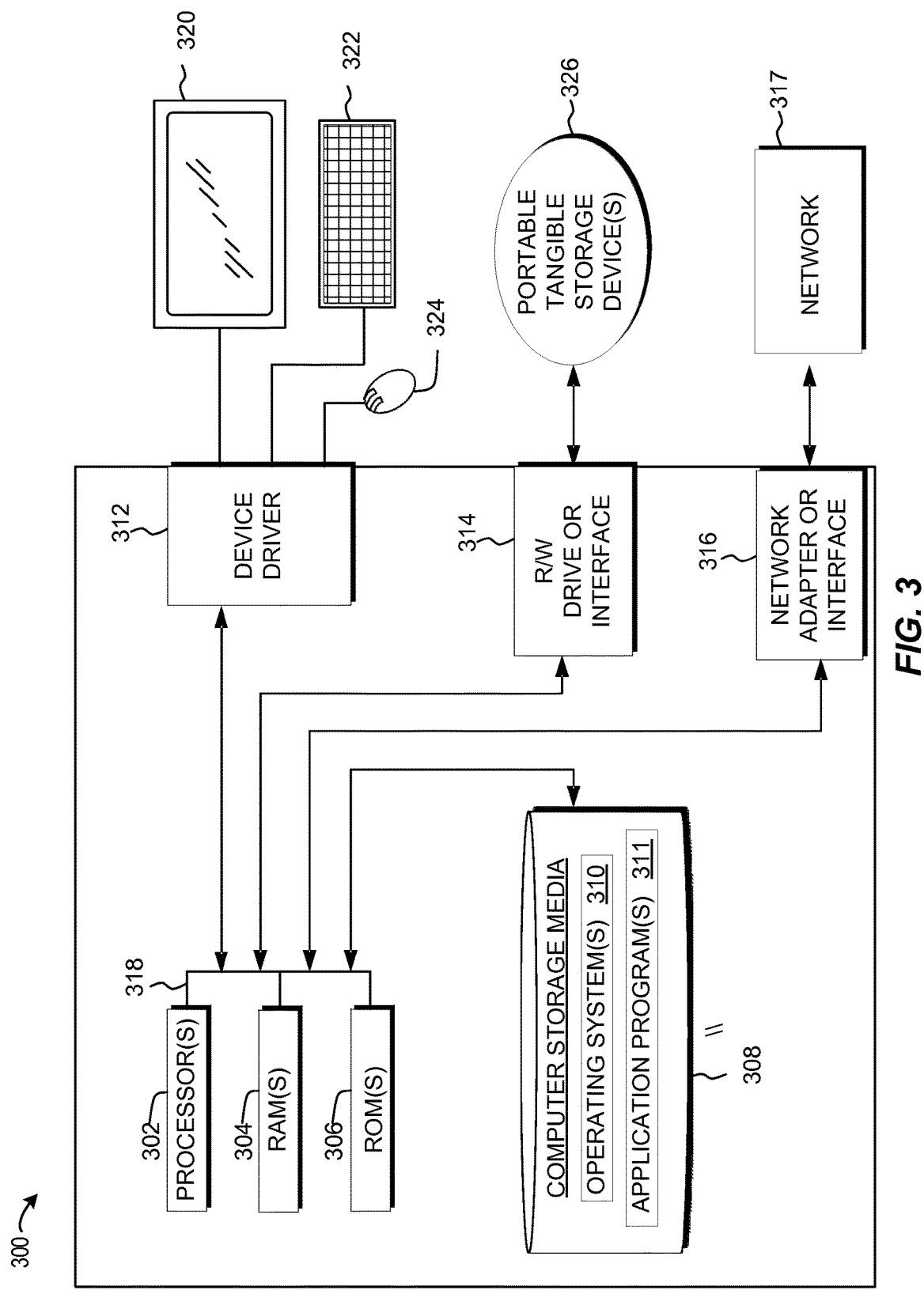
FIG. 3 depicts a schematic block diagram of components of a computerized system for implementing one or more method steps of FIGS. 1a-1b or FIG. 2, in accordance with an embodiment of the present invention.

Referring now to FIG. 3, FIG. 3 depicts a schematic block diagram of components of a computerized system for implementing one or more method steps of FIGS. 1a-1b or FIG. 2, in accordance with an embodiment of the present invention. Computerized devices can be suitably designed for implementing embodiments of the present invention as described herein. In that respect, it can be appreciated that the methods described herein are largely non-interactive and automated. In exemplary embodiments, the methods described herein can be implemented either in an interactive, partly-interactive or non-interactive system. The methods described herein can be implemented in software (e.g., firmware), hardware, or a combination thereof. In exemplary embodiments, the methods described herein are implemented in software, as an executable program, the latter executed by suitable digital processing devices. More generally, embodiments of the present invention can be implemented wherein general-purpose digital computers, such as personal computers, workstations, etc., are used. For example, the computer system depicted in FIG. 3, generally designated as system 300.

It should be appreciated that FIG. 3 provides only an illustration of one implementation and does not imply any limitations with regard to the environments in which different embodiments may be implemented. Many modifications to the depicted environment may be made.

System 300 may include one or more processors 302, one or more computer-readable RAMs 304, one or more computer-readable ROMs 306, one or more computer readable storage media 308, device drivers 312, read/write drive or interface 314, network adapter or interface 316, all interconnected over a communications fabric 318. Communications fabric 318 may be implemented with any architecture designed for passing data and/or control information between processors (such as microprocessors, communications and network processors, etc.), system memory, peripheral devices, and any other hardware components within a system.

One or more operating systems 310, and one or more application programs 311, for example, an application performing the present invention, are stored on one or more of the computer readable storage media 308 for execution by one or more of the processors 302 via one or more of the respective RAMs 304 (which typically include cache memory). In the illustrated embodiment, each of the computer readable storage media 308 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

System 300 may also include a R/W drive or interface 314 to read from and write to one or more portable computer readable storage media 326. Application programs 311 on system 300 may be stored on one or more of the portable computer readable storage media 326, read via the respective R/W drive or interface 314 and loaded into the respective computer readable storage media 308.

System 300 may also include a network adapter or interface 316, such as a TCP/IP adapter card or wireless communication adapter (such as a 4G wireless communication adapter using OFDMA technology) for connection to a network 317. Application programs 311 on system 300 may be downloaded to the computing device from an external computer or external storage device via a network (for example, the Internet, a local area network or other wide area network or wireless network) and network adapter or interface 316. From the network adapter or interface 316, the programs may be loaded onto computer readable storage media 308. The network may comprise copper wires, optical fibers, wireless transmission, routers, firewalls, switches, gateway computers and/or edge servers.

System 300 may also include a display screen 320, a keyboard or keypad 322, and a computer mouse or touchpad 324. Device drivers 312 interface to display screen 320 for imaging, to keyboard or keypad 322, to computer mouse or touchpad 324, and/or to display screen 320 for pressure sensing of alphanumeric character entry and user selections. The device drivers 312, R/W drive or interface 314 and network adapter or interface 316 may comprise hardware and software (stored on computer readable storage media 308 and/or ROM 306).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A computer implemented method for data obfuscation and right-protection, the method comprising:
   accessing, by a computer, an initial matrix $X_i$, the initial matrix $X_i$ representing an initial data set; and
   obtaining, by a computer, from the initial matrix $X_i$, a final matrix $X_f$, wherein obtaining the final matrix $X_f$ further comprises:
   projecting the initial matrix $X_i$ in a space having a lower dimension than the initial matrix $X_i$;
   obtaining a projected matrix $X_{Proj}$ by the following operation: $X_{Proj}=P(X_i)$;
   obfuscating the projected matrix $X_{Proj}$ to obtain a private matrix $X_{Priv}$, the private matrix $X_{Priv}$ obtained by the following operation: $X_{Priv}=X_{Proj}+E=P(X_i)+E$, the noise matrix E is added to the projected matrix $X_{Proj}$, to embed noise; and
   multiplying the private matrix $X_{Priv}$ by the matrix F, the final matrix $X_f$ obtained by the operations $X_f=(P(X_i)+E)F$ is right-protected,
   wherein the final matrix $X_f$ is obtained by performing one of the following operations:

$X_f=(P(X_i)+E)F;$ $X_f=P(X_i)F+E;$ and $X_f=P(X_iF)+E;$ wherein the final matrix $X_f$ further includes one or more of:
   a secret, the secret based on a random vector;
   a multiplicative noise value, having a lower magnitude than the obfuscated embedded noise;
   the matrix F, wherein a leading term is identity by a matrix I, the matrix I including one or more higher-order terms of the perturbation series of the matrix F, the secret, the multiplicative noise value, and a right-protected matrix, the right-protected matrix being multiplied by the matrix F;
   a perturbation matrix, the perturbation matrix being a matrix only using a perturbation series of the identity matrix I;
   a matrix $F_I$, the matrix $F_I$ can be represented by an equation $F_I=I+I_1$, wherein a matrix $I_1$ embeds the secret and multiplicative noise;
   a matrix $I_{1w}$, the matrix $I_{1w}$ further comprising pW, wherein W being a diagonal matrix containing a watermark w on its diagonal and p is a predetermine scalar value such that pW that has a lower magnitude than the added noise matrix E, the watermark w being a random vector with independent and identically distributed {−1,1} entries at positions indexed by a value S, the value S being an index set based on a fraction of the largest columns;

a matrix Fw, the matrix Fw represented by the equation Fw=I+$I_2$, wherein the matrix $I_2$ comprises $p_1W_1$, $W_1$ being a diagonal matrix containing a watermark $w_1$ on its diagonal, $w_1$ being a second random vector and $p_1$ is a scalar inversely proportional to theta value, the theta value being a lower magnitude than an added Gaussian noise value, the added Gaussian noise value being embedded through the noise matrix E; and a magnitude value of the secret, the magnitude value of the secret being multiplicative noise such that the preserve pairwise distances in the private matrix $X_{Priv}$ is preserved to a predetermined degree, wherein P(.) is a projection operator that projects an input initial matrix in a space having a lower dimension than the input matrix, E represents a noise matrix, and F represents a matrix as a perturbation series;

storing ell$^2$ norms $\|x_i\|_2$ of columns of the private matrix $X_{Priv}=[x_1, \ldots, x_n]$;

generating a set of final data corresponding to the final matrix $X_f$ available to one or more third-parties; and performing datamining on the generated set of final data based on the final matrix $X_f$.

2. The method of claim 1, wherein the noise matrix E is a matrix includes independent and identically distributed zero mean Gaussian random variables, a noise variance $\sigma^2$, the noise variance $\sigma^2$ being inversely proportional to a value $\epsilon^2$, the value $\epsilon$ being a predetermined privacy level value of final matrix $X_f$.

3. The method of claim 1, wherein the operator P(.) further comprises a random k×m projection matrix, the random k×m projection matrix being inversely proportional to the noise variance $\sigma^2$ and proportional to $\theta^2$, wherein theta θ is a largest $l^2$ norm of columns of the initial matrix $X_i$.

4. The method of claim 1, further comprising:
accessing a dataset Y, the dataset Y being represented by the equation $Y=[y_1, \ldots, y_n]$; and
in response to computing a vector μ as a vector having entries represented by the equation $\mu(Y)=\{(\|y_i\|_2^2 - \|x_i\|_2^2)/\|x_i\|_2^2,$ if i in S; 0 if i not in S$\}$, verifying the dataset Y as a watermarked dataset, the watermarked dataset including a watermark w.

5. The method of claim 4, wherein verifying the dataset Y further comprises:
calculating a correlation value between a normalized version of μ and a normalized version of the watermark w, each normalized according to the $l^2$ norm; and
applying the watermark w to the dataset Y, dataset Y being watermarked in response to the computed correlation value being larger than a threshold t in [0,1].

6. The method of claim 5, wherein the threshold t is represented by the equation $t = \sqrt{4\log(2/p_m)/n}$, wherein $p_m$ is an upper bound of the probability of misclassifying a given dataset as watermarked and n is a number of columns of the initial matrix $X_i$.

7. The method of claim 1, wherein projecting the initial matrix $X_i$ further comprises:
multiplying the initial matrix $X_i$, by a random projection matrix P, the random projection matrix P being a k×m matrix, such that the projected initial matrix $X_i$ is in a space having a lower dimension than the initial matrix $X_i$.

8. A computer program product for data obfuscation and right-protection, the computer program product comprising:
a computer-readable storage media and program instructions stored on the computer-readable storage media, the program instructions, executable by a device, comprising:
instructions to access, by a computer, an initial matrix $X_i$, the initial matrix $X_i$ representing an initial data set; and
instructions to obtain, by a computer, from the initial matrix $X_i$, a final matrix $X_f$, wherein instructions to obtain the final matrix $X_f$ further comprises:
instructions to project the initial matrix $X_i$ in a space having a lower dimension than the initial matrix $X_i$;
instructions to obtain a projected matrix $X_{Proj}$ by the following operation: $X_{Proj}=P(X_i)$;
instructions to obfuscate the projected matrix $X_{Proj}$ to obtain a private matrix $X_{Priv}$, the private matrix $X_{Priv}$ obtained by the following operation: $X_{Priv}=X_{Proj}+E=P(X_i)+E$, the noise matrix E is added to the projected matrix $X_{Proj}$, to embed noise; and
instructions to multiply the private matrix $X_{Priv}$ by the matrix F, the final matrix $X_f$ obtained by the operations $X_f=(P(X_i)+E)F$ is right-protected;
wherein the final matrix $X_f$ is obtained by performing one of the following operations:

$X_f=(P(X_i)+E)F;$ $X_f=P(X_i)F+E;$ and $X_f=P(X_iF)+E,$ wherein the final matrix $X_f$ further includes one or more of:
a secret, the secret based on a random vector;
a multiplicative noise value, having a lower magnitude than the obfuscated embedded noise;
the matrix F, wherein a leading term is identity by a matrix I, the matrix I including one or more higher-order terms of the perturbation series of the matrix F, the secret, the multiplicative noise value, and a right-protected matrix, the right-protected matrix being multiplied by the matrix F;
a perturbation matrix, the perturbation matrix being a matrix only using a perturbation series of the identity matrix I;
a matrix $F_I$, the matrix $F_I$ can be represented by an equation $F_I=I+I_1$, wherein a matrix $I_1$ embeds the secret and multiplicative noise;
a matrix $I_{1w}$, the matrix $I_{1w}$ further comprising pW, wherein W being a diagonal matrix containing a watermark w on its diagonal and p is a predetermine scalar value such that pW that has a lower magnitude than the added noise matrix E, the watermark w being a random vector with independent and identically distributed {−1,1} entries at positions indexed by a value S, the value S being an index set based on a fraction of the largest columns;
a matrix Fw, the matrix Fw represented by the equation Fw=I+$I_2$, wherein the matrix $I_2$ comprises $p_1W_1$, $W_1$ being a diagonal matrix containing a watermark $w_1$ on its diagonal, $w_1$ being a second random vector and $p_1$ is a scalar inversely proportional to theta value, the theta value being a lower magnitude than an added Gaussian noise value, the added Gaussian noise value being embedded through the noise matrix E; and a magnitude value of the secret, the magnitude value of the secret being multiplicative noise such that the preserve pairwise distances in the private matrix $X_{Priv}$ is preserved to a predetermined degree, wherein P(.) is a projection operator that projects an input initial matrix in a space having a lower dimension than the input matrix, E represents a noise matrix, and F represents a matrix as a perturbation series;

instructions to store ell$^2$ norms $\|x_i\|_2$ of columns of the private matrix $X_{Priv}=[x_1, \ldots, x_n]$;

instruction to generate a set of final data corresponding to the final matrix $X_f$ available to one or more third-parties; and instructions to perform datamining on the generated set of final data based on the final matrix $X_f$.

9. The computer program product of claim 8, wherein the noise matrix E is a matrix includes independent and identically distributed zero mean Gaussian random variables, a noise variance $\sigma^2$, the noise variance $\sigma^2$ being inversely proportional to a value $\epsilon^2$, the value $\epsilon$ being a predetermined privacy level value of final matrix $X_f$.

10. The computer program product of claim 8, wherein the operator P(.) further comprises a random k×m projection matrix, the random k×m projection matrix being inversely proportional to the noise variance $\sigma^2$ and proportional to $\theta^2$, wherein theta $\theta$ is a largest l$^2$ norm of columns of the initial matrix $X_i$.

11. A computer system for data obfuscation and right-protection, the computer system comprising:
one or more computer processors;
one or more computer-readable storage media;
program instructions stored on the computer-readable storage media for execution by at least one of the one or more processors, the program instructions comprising:
instructions to instructions to access, by a computer, an initial matrix $X_i$, the initial matrix $X_i$ representing an initial data set; and
instructions to obtain, by a computer, from the initial matrix $X_i$, a final matrix $X_f$, wherein instructions to obtain the final matrix $X_f$ further comprises:
instructions to project the initial matrix $X_i$ in a space having a lower dimension than the initial matrix $X_i$;
instructions to obtain a projected matrix $X_{Proj}$ by the following operation: $X_{Proj}=P(X_i)$;
instructions to obfuscate the projected matrix $X_{Proj}$ to obtain a private matrix $X_{Priv}$, the private matrix $X_{Priv}$ obtained by the following operation: $X_{Priv}=X_{Proj}+E=P(X_i)+E$, the noise matrix E is added to the projected matrix $X_{Proj}$, to embed noise; and
instructions to multiply the private matrix $X_{Priv}$ by the matrix F, the final matrix $X_f$ obtained by the operations $X_f=(P(X_i)+E)F$ is right-protected;
wherein the final matrix $X_f$ is obtained by performing one of the following operations:

$X_f=(P(X_i)+E)F$;

$X_f=P(X_i)F+E$; and $X_f=P(X_iF)+E$, wherein the final matrix $X_f$ further includes one or more of:
a secret, the secret based on a random vector;
a multiplicative noise value, having a lower magnitude than the obfuscated embedded noise;
the matrix F, wherein a leading term is identity by a matrix I, the matrix I including one or more higher-order terms of the perturbation series of the matrix F, the secret, the multiplicative noise value, and a right-protected matrix, the right-protected matrix being multiplied by the matrix F;
a perturbation matrix, the perturbation matrix being a matrix only using a perturbation series of the identity matrix I;
a matrix $F_I$, the matrix $F_I$ can be represented by an equation $F_I=I+I_1$, wherein a matrix $I_1$ embeds the secret and multiplicative noise;
a matrix $I_{1w}$, the matrix $I_{1w}$ further comprising pW, wherein W being a diagonal matrix containing a watermark w on its diagonal and p is a predetermine scalar value such that pW that has a lower magnitude than the added noise matrix E, the watermark w being a random vector with independent and identically distributed {−1,1} entries at positions indexed by a value S, the value S being an index set based on a fraction of the largest columns;
a matrix Fw, the matrix Fw represented by the equation $Fw=I+I_2$, wherein the matrix $I_2$ comprises $p_1W_1$, $W_1$ being a diagonal matrix containing a watermark $w_1$ on its diagonal, $w_1$ being a second random vector and $p_1$ is a scalar inversely proportional to theta value, the theta value being a lower magnitude than an added Gaussian noise value, the added Gaussian noise value being embedded through the noise matrix E; and
a magnitude value of the secret, the magnitude value of the secret being multiplicative noise such that the preserve pairwise distances in the private matrix $X_{Priv}$ is preserved to a predetermined degree,
wherein P(.) is a projection operator that projects an input initial matrix in a space having a lower dimension than the input matrix, E represents a noise matrix, and F represents a matrix as a perturbation series;
instructions to store ell$^2$ norms $\|x_i\|_2$ of columns of the private matrix $X_{Priv}=[x_1, \ldots, x_n]$;
instruction to generate a set of final data corresponding to the final matrix $X_f$ available to one or more third-parties; and
instructions to perform datamining on the generated set of final data based on the final matrix $X_f$.

12. The computer system of claim 11, wherein the noise matrix E is a matrix includes independent and identically distributed zero mean Gaussian random variables, a noise variance $\sigma^2$, the noise variance $\sigma^2$ being inversely proportional to a value $\epsilon^2$, the value $\epsilon$ being a predetermined privacy level value of final matrix $X_f$.

13. The computer system of claim 11, wherein the operator P(.) further comprises a random k×m projection matrix, the random k×m projection matrix being inversely proportional to the noise variance $\sigma^2$ and proportional to $\theta^2$, wherein theta $\theta$ is a largest l$^2$ norm of columns of the initial matrix $X_i$.

* * * * *